(12) United States Patent
Canova et al.

(10) Patent No.: US 8,949,921 B2
(45) Date of Patent: Feb. 3, 2015

(54) APPLICATION MANAGER FOR DIGITAL TELEVISION RECEIVER FOR MANAGING INTERACTIVE APPLICATIONS OF VARIOUS TYPES

(75) Inventors: Weber George Canova, Barueri (BR); David Estevam de Brito, Itaipu (BR); Marcio Antonio Ramos Alves, Recreio (BR)

(73) Assignee: TQTVD Software Ltda., Rio de Janeiro (BR)

( * ) Notice: Subject to any disclaimer, the term of this patent is extended or adjusted under 35 U.S.C. 154(b) by 139 days.

(21) Appl. No.: 13/121,563

(22) PCT Filed: Aug. 18, 2009

(86) PCT No.: PCT/BR2009/000259
§ 371 (c)(1),
(2), (4) Date: Mar. 29, 2011

(87) PCT Pub. No.: WO2010/037188
PCT Pub. Date: Apr. 8, 2010

(65) Prior Publication Data
US 2011/0179459 A1 Jul. 21, 2011

(30) Foreign Application Priority Data
Sep. 30, 2008 (BR) ..................................... 0804100

(51) Int. Cl.
*H04N 7/173* (2011.01)
*H04N 7/16* (2011.01)
*H04N 21/443* (2011.01)
*H04N 21/6543* (2011.01)
*H04N 21/81* (2011.01)
*H04N 21/458* (2011.01)

(52) U.S. Cl.
CPC ........ *H04N 21/4432* (2013.01); *H04N 21/4586* (2013.01); *H04N 21/6543* (2013.01); *H04N 21/8173* (2013.01)
USPC ............ 725/132; 725/105; 725/140; 725/152

(58) Field of Classification Search
CPC .................... H04N 21/26291; H04N 21/4432; H04N 21/4586; H04N 21/6543; H04N 21/8173
USPC .................................. 725/105, 132, 140, 152
See application file for complete search history.

(56) References Cited

U.S. PATENT DOCUMENTS

| | | | |
|---|---|---|---|
| 6,928,468 B2 * | 8/2005 | Leermakers ................... | 725/114 |
| 7,277,870 B2 * | 10/2007 | Mourad et al. ................... | 725/87 |
| 7,860,954 B2 * | 12/2010 | Sato .................................. | 725/39 |
| 2003/0208778 A1 * | 11/2003 | Aratani et al. ................... | 725/139 |
| 2004/0015998 A1 * | 1/2004 | Bokor et al. ...................... | 725/32 |
| 2004/0181818 A1 * | 9/2004 | Heyner et al. ................... | 725/146 |
| 2005/0155057 A1 * | 7/2005 | Wei .................................. | 725/38 |
| 2005/0166246 A1 * | 7/2005 | Calmels et al. ................ | 725/105 |
| 2006/0112179 A1 * | 5/2006 | Baumeister et al. .......... | 709/226 |
| 2006/0179465 A1 * | 8/2006 | Lemmers ....................... | 725/100 |

(Continued)

*Primary Examiner* — Randy Flynn
(74) *Attorney, Agent, or Firm* — Laurence P. Colton; Smith Risley Tempel Santos LLC (57) ABSTRACT

The present invention describes a method for managing digital files, such as, for example, applications developed for TV digital, in a digital TV receiver apparatus, as well as a manager of said digital files. Particularly, the manager has a visual interface that enables the user to identify which applications are present in the digital TV receiver apparatus, install and/or unin-stall applications, in addition to providing fast access to certain applications.

6 Claims, 7 Drawing Sheets

(56) References Cited

U.S. PATENT DOCUMENTS

| | | | |
|---|---|---|---|
| 2006/0259924 A1* | 11/2006 | Boortz | 725/32 |
| 2007/0022434 A1* | 1/2007 | Oh | 725/32 |
| 2007/0261090 A1* | 11/2007 | Miller et al. | 725/135 |
| 2008/0034309 A1* | 2/2008 | Louch et al. | 715/766 |
| 2008/0034392 A1* | 2/2008 | McCarthy et al. | 725/61 |
| 2008/0066105 A1* | 3/2008 | Kim et al. | 725/40 |
| 2008/0066111 A1* | 3/2008 | Ellis et al. | 725/57 |
| 2009/0217320 A1* | 8/2009 | Aldrey | 725/131 |
| 2009/0282434 A1* | 11/2009 | Yasuho et al. | 725/33 |
| 2010/0017832 A1* | 1/2010 | Wang | 725/109 |

* cited by examiner

APPLICATION MANAGER FOR DIGITAL TELEVISION RECEIVER FOR MANAGING INTERACTIVE APPLICATIONS OF VARIOUS TYPES

BACKGROUND OF THE INVENTION

1. Field of the Invention

The present invention describes a method for managing digital files, such as, for example, applications developed for digital TV, in a digital TV receiver apparatus with support for the execution of said digital files, as well as a manager of said digital files.

Particularly, the manager has a visual interface that enables the user to identify which applications are present in the digital TV receiver apparatus, install and/or uninstall applications, in addition to providing quick access to certain applications.

2. Prior Art

A digital TV receiver apparatus is a device capable of receiving and decoding the digital signals sent by broadcasters for presentation on a monitor. Said apparatus can be fixed (integrated to the TV set or not), portable or mobile.

Several applications already exist and are being developed for said receiver apparatus, and include, for example, solutions for e-business, program guides, access to stock exchange trading figures, weather forecast, games, surveys and many others.

In the model proposed for Brazilian digital TV, said applications are sent independently by broadcasters and received by digital receiver apparatus with support for interactivity, which are responsible for executing them. In this model, when we change channels, the current application is interrupted, and not saved, so that the application of another broadcaster can be loaded.

As the possibilities for interaction increase, along with the access speeds and the storage capacity of the digital TV receiver apparatus, new opportunities for the development of these applications appear.

In the proposed scenario, applications can be developed so that they co-exist on the digital TV receiver apparatus co-operatively in such a way that the user has a positive and satisfactory experience when using them. Furthermore, since resources are limited in digital TV receiver apparatus, there is a need to manage the applications, providing a streamlined control of said resources.

With this in mind, document WO 00/30346 describes a method for managing a receiver apparatus designed to manage the hardware components, such as sound and image components, memory, among others.

The present invention differs from this document by not being designed to manage the hardware, but rather the digital content that can be executed by the receiver apparatus.

The literature search revealed no documents revealing or suggesting the teachings of the present invention, to the extent that the solution proposed herein is novel and inventive in comparison with the state of the art.

BRIEF SUMMARY OF THE INVENTION

It is an object of the present invention to provide a digitally legible means comprising program code lines and means for executing said program code lines so as to implement, in a digital TV receiver apparatus, a digital file manager comprising a set of mechanisms accessed through a visual interface, wherein the interface enables the user to:

a) identify which digital files are present in the digital TV receiver apparatus;
b) create an account that enables him to customize which digital files he wishes to access, and how to classify them according to his preference;
c) customize the appearance of the visual interface of the manager according to his account preferences;
d) receive and install digital files in the digital TV receiver apparatus from suitable transmission means;
e) uninstall the digital files present in the digital TV receiver apparatus;
f) see which digital files transmitted by the broadcaster have been installed in the digital TV receiver apparatus;
g) select digital files so that they have differentiated access from other digital files;
h) execute any digital files when he so wishes; and
i) combinations of the above items.

It is also an object of the present invention to provide a method of implementing a digital file manager comprising the steps of:

a) providing a digitally legible means comprising program code lines; and
b) executing said program code lines so as to implement a digital file manager comprising a set of mechanisms (algorithms) accessed through a visual interface, wherein the interface enables the user to:
  i) identify which digital files are present in the digital TV receiver apparatus;
  ii) create an account that enables him to customize which digital files he wishes to access, and how to classify them according to his preference;
  iii) customize the appearance of the visual interface of the manager according to his account preferences;
  iv) receive and install digital files in the digital TV receiver apparatus from suitable transmission means;
  v) uninstall the digital files present in the digital TV receiver apparatus;
  vi) select digital files so that they have differentiated access from other digital files;
  vii) execute any digital files when he so wishes; and
  viii) combinations of the above items; wherein the digitally legible means is built into the digital TV receiver apparatus.

These and other objects of the invention will be immediately appreciated by a person skilled in the art and shall now be described in sufficient detail such that they may be reproduced.

DETAILED DESCRIPTION OF PREFERRED EMBODIMENTS

The examples and figures, in which like reference numerals represent like features throughout the several views, shown herein are solely intended to exemplify one of the innumerous manners of carrying out the invention, not to limit the scope thereof.

Digital TV Receiver Apparatus

Figure 1:
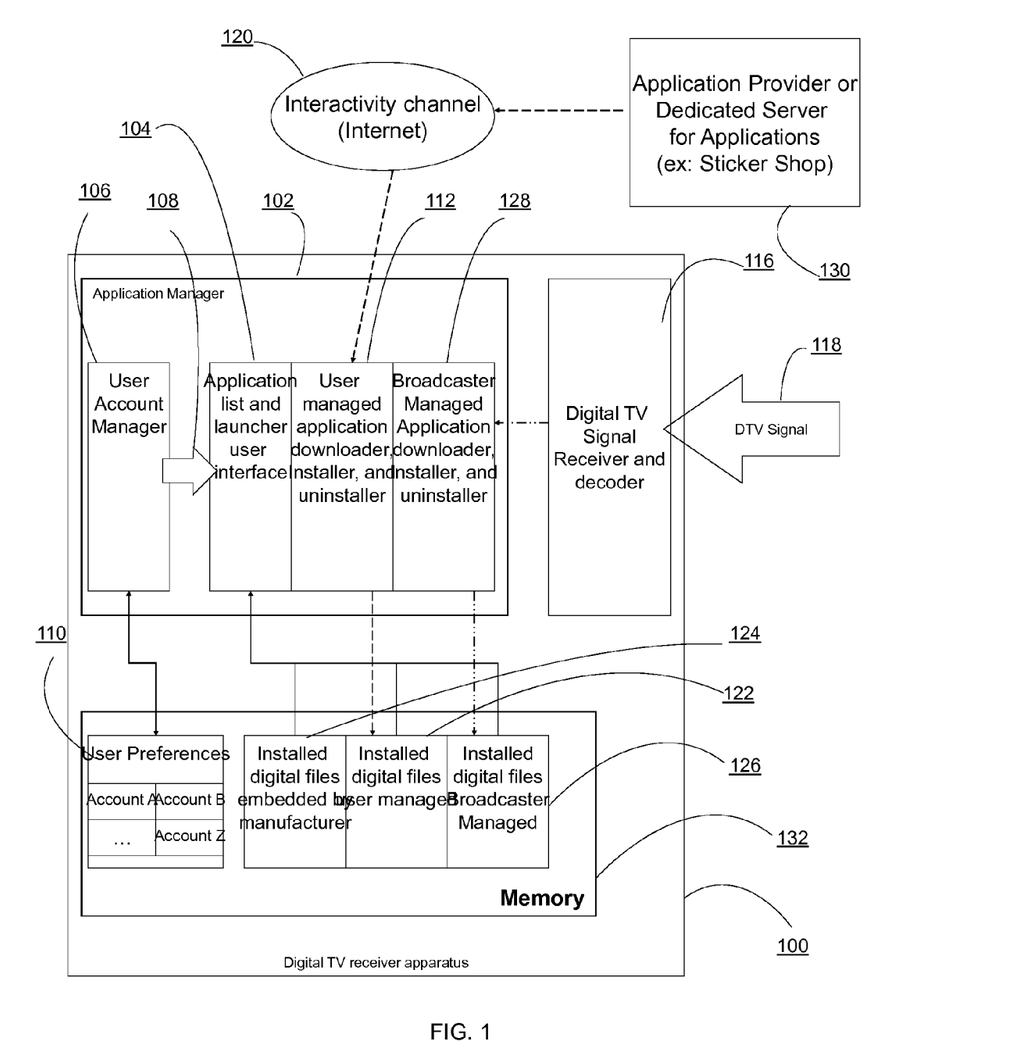
FIG. 1 is an architecture of a digital television receiver apparatus implementation that includes an application manager system for manufacturer embedded applications, user managed applications and broadcasters managed applications of the present invention.

For the purposes of the present invention, the expression "digital TV receiver apparatus" 100 is understood to be any device with support for executing the digital files 104, 428, 524 capable of receiving and decoding 116 the digital TV signals sent by broadcasters 118, for presentation on a monitor 200. Said apparatus can be fixed (integrated to the TV set or not), portable or mobile.

Digital Files

For the purposes of the present invention, the expression "digital files" is understood to comprise interactive applications for execution on a digital TV receiver apparatus 100.

Suitable Transmission Means

For the purposes of the present invention, the expression "suitable transmission means" is understood to be any means capable of sending digital files to the digital TV receiver apparatus. Examples of suitable means include, but are not limited to, the digital signal of a broadcaster 118 and the interactivity channel 120.

Interactivity Channel

For the purposes of the present invention, the expression "interactivity channel" 120 is understood to be any means capable of sending digital files from or receiving digital files in the digital TV receiver apparatus 100. An example of an interactivity channel 120 is the internet.

Manager of Digital Files

One of the most important aspects disclosed by the present invention is that it provides a solution for managing interactive applications sent by broadcasters 128 as part of the signal content of Digital TV 118. However, the solution described by the present invention also applies to applications transmitted 112 by any interactivity channel 120 technology provided by Digital TV receiver apparatus 100, and these applications can originate from various types of providers 130.

Figure 2:
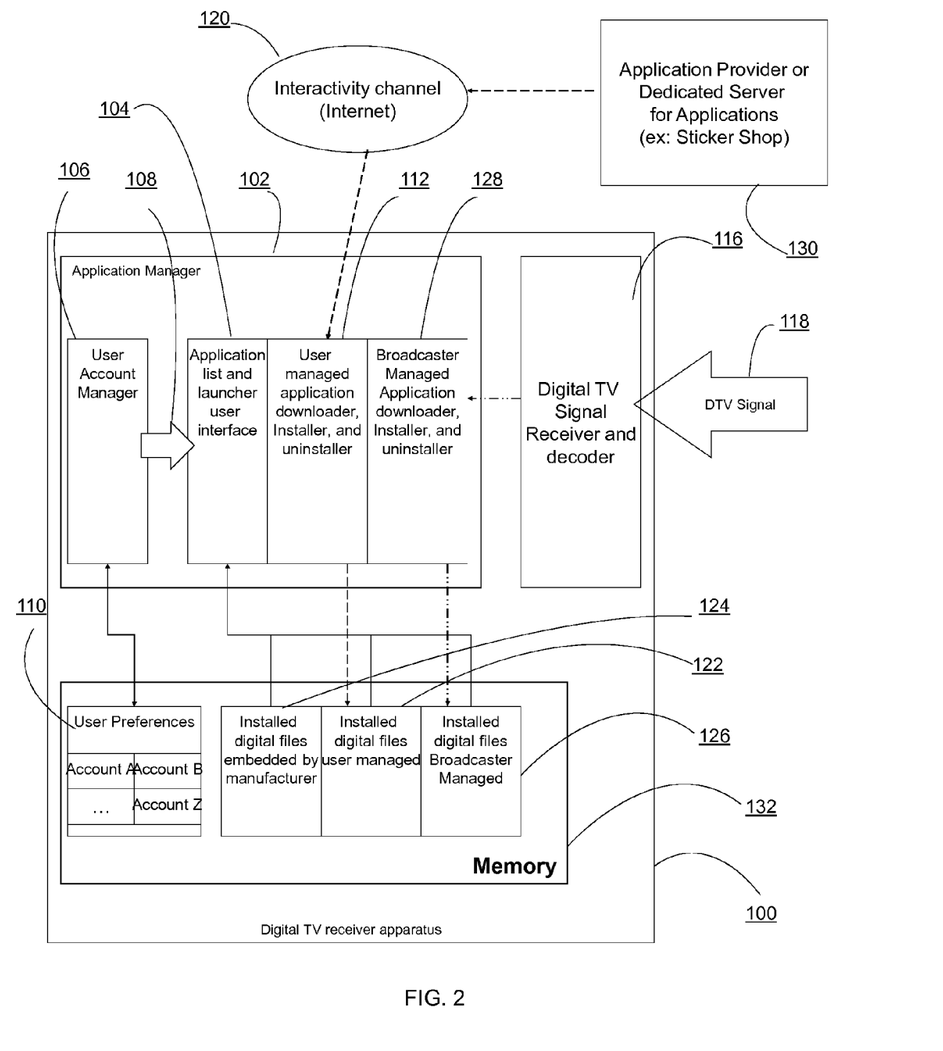
FIG. 2 is an architecture of a digital television receiver apparatus implementation that includes an application manager system for manufacturer embedded applications, user managed applications and broadcasters managed applications of the present invention.
Figure 3:
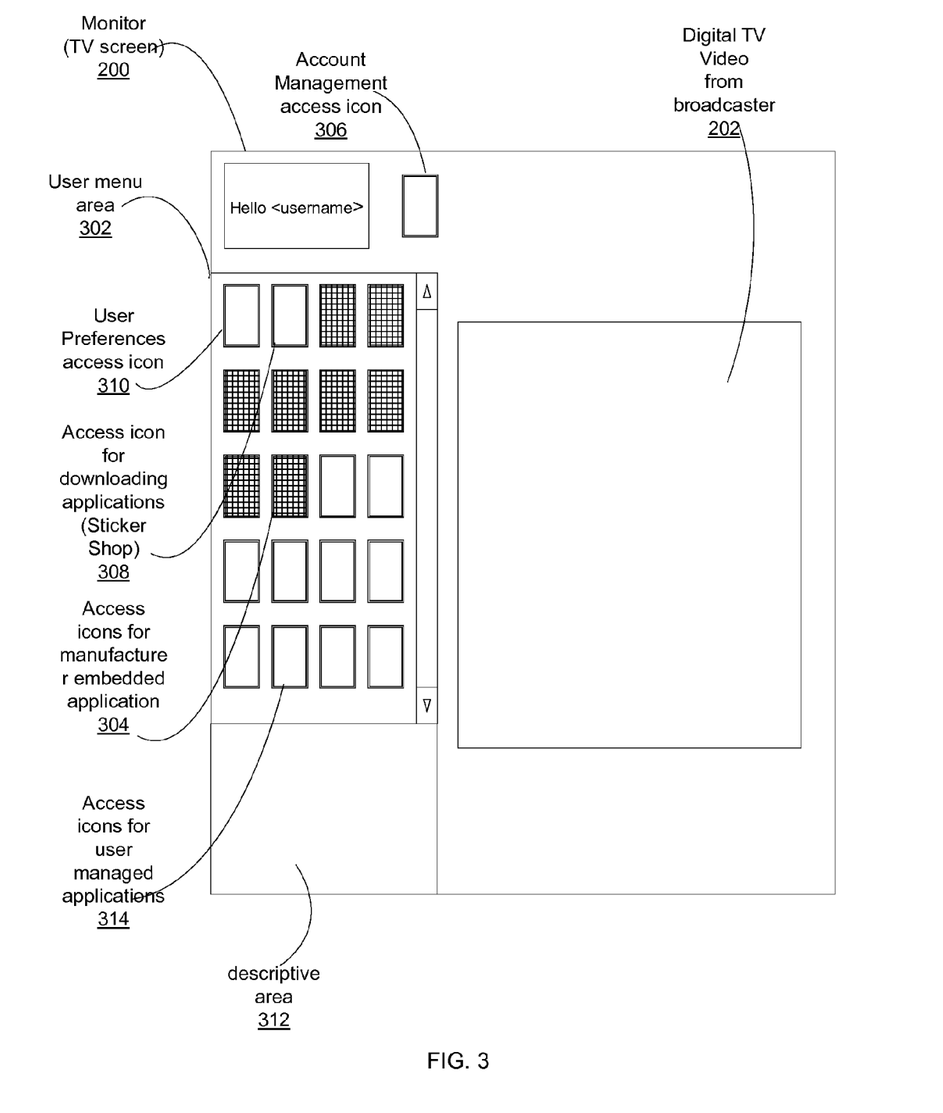
FIG. 3 is an example of a television screen layout for the user menu of the present invention.
Figures 4A, 4B:
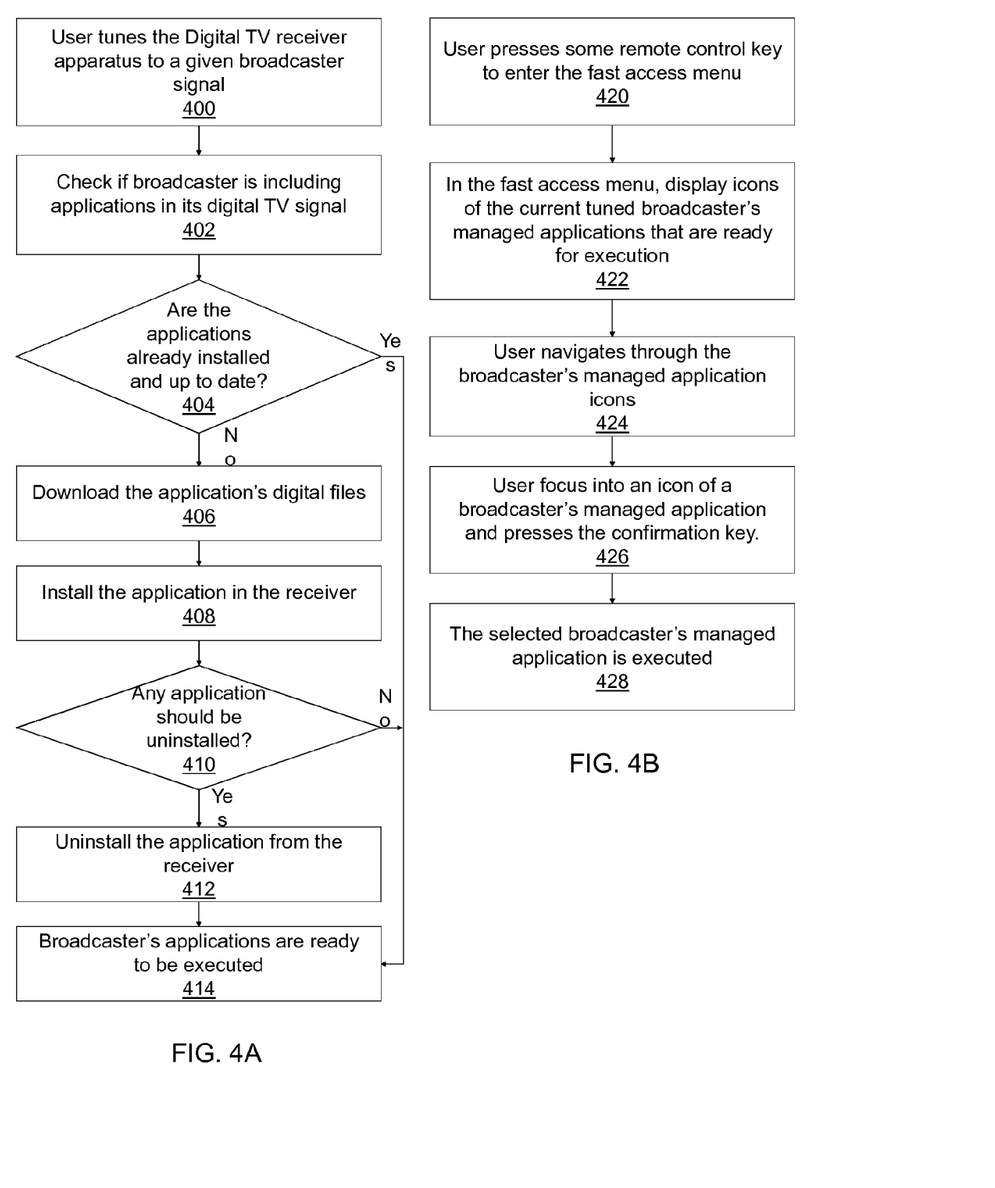
FIG. 4A is a flowchart for broadcaster managed application downloading, installing and uninstalling of the present invention.
FIG. 4B is a flowchart for broadcaster managed application listing and execution of the present invention.
Figure 5A:
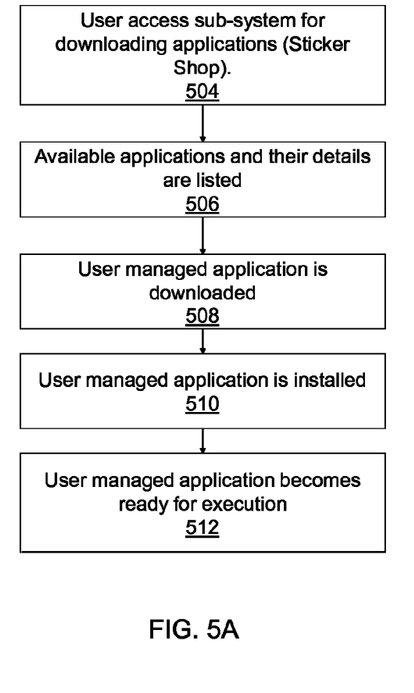
FIG. 5A is a flowchart for user managed application downloading and installing of the present invention.
Figure 6:
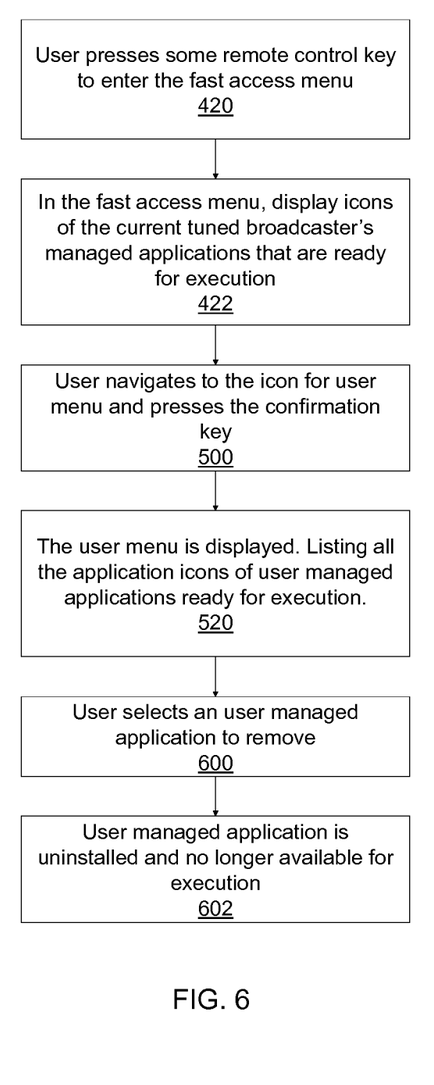
FIG. 6 is a flowchart for uninstalling user managed application of the present invention.

The manager 102 of digital files of the present invention is present in a digitally legible means comprising program code lines and means for executing said program code lines so as to implement the manager of digital files comprising a visual interface, as shown in FIGS. 2 and 3, wherein the interface enables the user to:

a) identify which digital files are present in the digital TV receiver apparatus 104, 206, 208, 304, 314, 422, 520;

b) create an account that enables him to customize which digital files he wishes to access, and to classify them according to his preference 106;

c) customize the appearance of the visual interface of the manager 108 according to his account preferences 110, 310;

d) receive and install digital files in the digital TV receiver apparatus from suitable transmission means 112, 122, 126, 128, 406, 408, 508, 510;

e) uninstall the digital files present in the digital TV receiver apparatus 112, 122, 126, 128, 412, 602;

f) see which digital files have been transmitted by the broadcaster and installed in the digital TV receiver apparatus 104, 126, 206, 208, 404, 422;

g) select digital files so that they have differentiated access from other digital files 104;

h) execute any digital files when he so wishes 104, 208, 304, 314, 428, 524; and i) combinations of the above items. The digital file manager is built into the digital TV receiver apparatus.

Example 1

The applications manager, called "Sticker Center", is built in by the manufacturer to the memory of the digital TV receptor, and is called by the user by a button (dedicated or not) on the remote control 420. When called, the manager appears above a background that can be, but is not limited to, a video 202 being aired by the broadcaster currently tuned 400, a static or animated image file, or a video file built into the receptor.

Figure 5B:
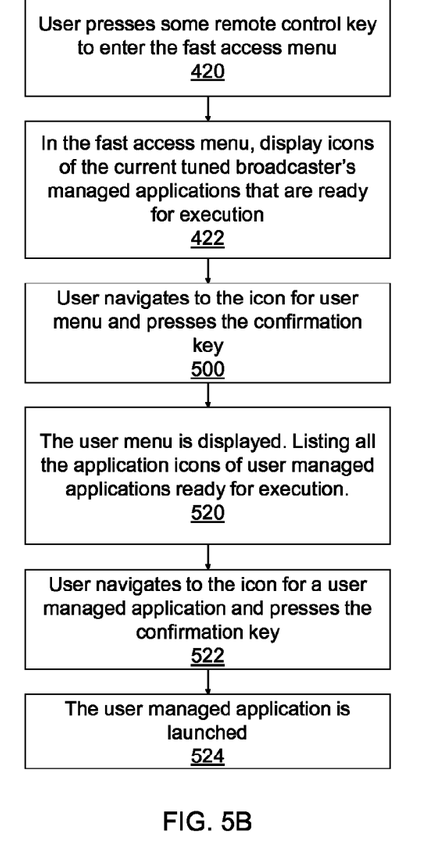
FIG. 5B is a flowchart for user managed application listing and execution of the present invention.
Figure 7:
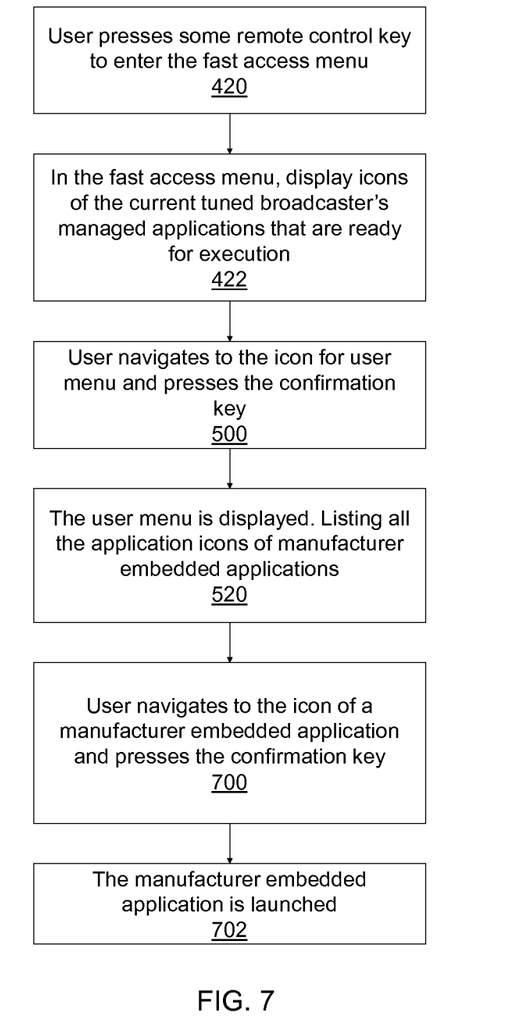
FIG. 7 is a flowchart for manufacturer embedded application listing and execution of the present invention.

The essential function of the applications manager is to manage and execute different types of applications installed in the receptor 428, 524, 702.

The first types of applications controlled by the manager are the utility applications installed by the user in the receptor 122, 314, and as shown in FIG. 5A (the "stickers").

The second types of applications controlled by the manager are the applications previously installed in the receptor by the manufacturer 124, 304 (the "prime stickers").

The third type of applications controlled by the manager are the applications that are being transmitted by the digital signal of the broadcaster currently tuned 400, and that will work only for as long as this broadcaster is tuned in (broadcaster stickers) 126. These applications will be identified 402, received 406 and installed 408 by the manager 128. If the broadcaster so wishes 410, these applications may be uninstalled 412 from the receptor by a specific command sent via digital TV signal to the manager. As shown in FIG. 4A.

The icons that call these three types of applications can be seen in the applications manager, and can be displayed on the TV screen in an area for quick access (main menu) 206 or on a specific user menu called "My stickers" 302, 304, 314.

The display for fast access (main menu) 206 can be shown vertically or horizontally. The limit on the screen will be 1 access icon to the user menu (My stickers) 204, 500 and X icons for applications compatible with the manager that are being transmitted by the signal of the broadcaster currently tuned (broadcaster stickers) 208.

When the user uses the arrows of the remote control to move the navigation focus through the fast access menu (main menu) to the desired icon 208, 424 and press the confirmation key (OK), the corresponding application (broadcaster sticker) will be executed by the receptor 428.

When the user uses the arrows of the remote control to move the navigation focus through the fast access menu (main menu) to the access the icon for the user menu (My stickers) and presses the confirmation key (OK) 500, the user menu will appear 520.

When the Sticker Center is accessed, the "broadcaster stickers" are automatically downloaded 406 by the digital signal from the TV broadcaster currently tuned 400 in and are installed 408 in the digital TV receptor in an area dedicated to installing these applications 126, as shown in FIG. 4A.

The broadcaster may uninstall these applications automatically by sending the respective digital TV command signal 410, 412, for example, at the end of a certain program.

In relation to the display for the user menu (My Stickers) the total limit of stickers displayed 520, 304, 314 will be determined by the quantity of applications installed which, in turn, is limited by the quantity of memory 132 available in the receptor. These sticker icons 304, 314 can be chosen and organized by the user by way of a configuration interface.

When the user uses the arrows of the remote control to move the navigation focus to the desired icon 304, 314 and presses the confirmation key (OK) 522, the corresponding utility application (Sticker) will be executed by the receptor 524, 702.

During the process of navigating through the interface of the user menu, descriptive information on the "stickers" can be seen in the descriptive area 312.

The applications manager enables the user's accounts to be managed 106, and creating at least one account in the manager is an important step requested upon first access to the system.

Once the first account is created, it is possible to create new accounts or edit existing accounts by just accessing the accounts management area by way of the respective icon 306.

Each account stores information on a given user 110, such as the configurations of the manager, of the menu, data of each application, among others.

The sub-system "Sticker Shop" is accessible from the "Sticker Center" 308, 504. This sub-system is stored in a dedicated server 130, which will be accessed by way of the digital receptor through the interactivity channel 120. It will be possible to locate, see details and make a free or paid transfer of utility applications ("stickers") in the "Sticker Shop" 506. The "stickers" can be downloaded via the interactivity channel 508 and executed through the digital receiver 512, 524.

The number of applications that can be received and installed is limited by the memory of the receiver 132.

The invention claimed is:

1. An application manager system for a digital television receiver apparatus, for managing interactive applications for execution on the digital television apparatus, comprising:
    a) a first type of application that has been downloaded and installed into the digital television receiver apparatus by a user from a suitable bidirectional transmission channel;
    b) a second type of application that has been embedded in the digital television receiver apparatus by a manufacturer of the digital television receiver apparatus;
    c) a third type of application that has been downloaded from a broadcast digital television signal, wherein
        i) the third type of application has been installed in the digital television receiver apparatus by a digital television broadcaster, and further comprising means for allowing the digital television broadcaster to automatically download, install, and remove the third type of application in the digital television receiver apparatus, and
        ii) the third type of application that is removed from the digital television receiver apparatus was previously installed by the digital television broadcaster; and
    d) a user interface that comprises
        i) a quick access menu for listing and launching those of the three types of applications that are related to a currently tuned digital television broadcaster, thereby providing a privileged access to those of the three types of applications that are related to a currently tuned digital television broadcaster, and
        ii) a second level menu, accessible from the quick access menu, for listing and launching applications selected from the group consisting of the first type of application, the second type of application, and combinations thereof, and for allowing a user to download, install, or remove the first type of application.

2. The application manager system as claimed in claim 1, wherein the suitable bidirectional transmission channel is selected from the group consisting of data networks and the Internet.

3. The application manager system as claimed in claim 1, wherein the applications related to a currently tuned digital television broadcaster are represented by icons.

4. The application manager system as claimed in claim 1, wherein the applications listed in the quick access menu are managed by a currently tuned digital television broadcaster.

5. The application manager system as claimed in claim 1, wherein the applications listed in the second level menu have an ordering and appearance that is customizable by a user.

6. The application manager system as claimed in claim 5, wherein the user customizations are associated to user accounts, and wherein several user accounts can be created on the digital television receiver apparatus, thereby allowing storing and displaying of different customizations of the menu for the first type of application in the same digital television receiver apparatus.

* * * * *